United States Patent
Hirth et al.

(10) Patent No.: US 10,364,721 B2
(45) Date of Patent: Jul. 30, 2019

(54) LAYER PACKET CONTACTING FOR ELECTRICALLY HEATABLE HONEYCOMB BODY

(71) Applicant: CONTINENTAL AUTOMOTIVE GMBH, Hannover (DE)

(72) Inventors: Peter Hirth, Rösrath (DE); Thomas Härig, Neunkirchen-Seelscheid (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/862,113

(22) Filed: Jan. 4, 2018

(65) Prior Publication Data

US 2018/0128144 A1    May 10, 2018

Related U.S. Application Data

(63) Continuation of application No. PCT/EP2016/065181, filed on Jun. 29, 2016.

(30) Foreign Application Priority Data

Jul. 7, 2015    (DE) .......................... 10 2015 212 705

(51) Int. Cl.
  *F01N 3/20*    (2006.01)
  *B01J 12/00*    (2006.01)
  (Continued)

(52) U.S. Cl.
  CPC .......... *F01N 3/2026* (2013.01); *B01D 53/00* (2013.01); *B01J 12/00* (2013.01); *B01J 35/0033* (2013.01);
  (Continued)

(58) Field of Classification Search
  CPC ... F01N 2330/44; F01N 2330/02; F01N 3/281
  (Continued)

(56) References Cited

U.S. PATENT DOCUMENTS 2,706,496 A    4/1955    Bond
4,976,929 A *  12/1990    Cornelison ........ B01D 53/9454
                                              422/174
(Continued)

FOREIGN PATENT DOCUMENTS

DE    4307431 A1    9/1994
DE    19512097 A1    10/1996
(Continued)

OTHER PUBLICATIONS

International Search Report and Written Opinion dated Sep. 2, 2016 from corresponding International Patent Application No. PCT/EP2016/065181.

*Primary Examiner* — Tom P Duong

(57) ABSTRACT

An electrically conductive connection between at least two electrically conductive stacks of at least partially structured, metal foils which form a large number of channels through which a fluid may flow, comprising at least one electrically conductive rod element which passes through the at least two stacks, wherein a spacer element is arranged on the at least one rod element and between the at least two stacks, the two stacks being arranged at a distance from one another by the spacer element; wherein an arrangement comprising the at least two stacks, the at least one rod element and the spacer element is clamped by at least one clamping element.

13 Claims, 4 Drawing Sheets

(51) Int. Cl.
*B01J 35/00* (2006.01)
*F01N 3/28* (2006.01)
*H05B 3/08* (2006.01)
*B01D 53/00* (2006.01)

(52) U.S. Cl.
CPC ............... *F01N 3/281* (2013.01); *H05B 3/08* (2013.01); *F01N 2330/02* (2013.01); *F01N 2330/44* (2013.01); *Y02T 10/26* (2013.01)

(58) Field of Classification Search
USPC .......................................... 422/174, 177, 180
See application file for complete search history.

(56) References Cited

U.S. PATENT DOCUMENTS

| | | | | |
|---|---|---|---|---|
| 5,146,743 | A * | 9/1992 | Maus | B01J 35/04 60/274 |
| 5,177,961 | A * | 1/1993 | Whittenberger | F01N 3/2026 422/174 |
| 5,278,125 | A * | 1/1994 | Iida | B01J 35/04 428/116 |
| 5,322,672 | A * | 6/1994 | Breuer | B01J 35/04 422/180 |
| 5,322,673 | A | 6/1994 | Eason | |
| 5,413,767 | A * | 5/1995 | Breuer | F01N 3/2026 422/174 |
| 5,525,309 | A * | 6/1996 | Breuer | B01J 35/04 422/174 |
| 5,562,885 | A * | 10/1996 | Bayer | B01J 35/0033 422/174 |
| 6,589,910 | B1 | 7/2003 | Swars | |
| 6,821,639 | B2 * | 11/2004 | Kato | F01N 3/2842 228/181 |
| 2013/0206269 | A1 | 8/2013 | Sutherland | |

FOREIGN PATENT DOCUMENTS

| | | |
|---|---|---|
| DE | 19922355 A1 | 11/2000 |
| EP | 0853719 A1 | 7/1998 |
| EP | 0882874 A2 | 12/1998 |
| EP | 1967712 A3 | 9/2009 |
| JP | 2006167688 A | 6/2006 |
| KR | 101999006620 | 1/1999 |
| WO | 8910471 A1 | 11/1989 |
| WO | 96/10127 A1 | 4/1996 |
| WO | 2013150066 A1 | 10/2013 |

* cited by examiner

LAYER PACKET CONTACTING FOR ELECTRICALLY HEATABLE HONEYCOMB BODY

CROSS-REFERENCE TO RELATED APPLICATIONS

This application claims the benefit of PCT Application PCT/EP2016/065181, filed Jun. 29, 2016, which claims priority to German Patent Application 10 2015 212 705.2, filed Jul. 7, 2015. The disclosures of the above applications are incorporated herein by reference.

FIELD OF THE INVENTION

The present invention relates to the field of electrically heatable honeycomb bodies, in particular for exhaust gas treatment systems of internal combustion engines, preferably in motor vehicles.

BACKGROUND OF THE INVENTION

Electrically heatable honeycomb bodies are required, for example, in order to heat components and/or fluids in an exhaust gas purification system in order to achieve or maintain a specific minimum temperature for specific chemical reactions, in particular also for catalytically activated reactions, as a result. This is employed, for example, in exhaust gas catalytic converters, particle filters and/or systems for reducing nitrous oxides.

A typical design of an electrically heatable honeycomb body of this kind is described, for example, in WO 96/10127. EP 1 967 712 also shows the structure of an electrically heatable honeycomb body. Both documents provide the option of supporting (in an electrically insulated manner) an electrically heatable honeycomb body of this kind on an adjacent honeycomb body.

In order to be able to provide a sufficiently high non-reactive resistance for electrical heating, electrically heatable honeycomb bodies of this kind comprise at least one stack of several sheet metal layers (for example foils) which are structured such that they form channels through which a fluid (in particular gas) may flow in an axial direction. Coarsely structured metal sheets, and also finely structured and/or smooth metal sheets are typically layered alternately one on the other for this purpose. The sheet metal layers within one stack are preferably soldered to one another or fastened to one another by diffusion connections at a few (selected) or all contact points.

On account of the stack being looped in an opposite direction in the shape of an S, in the shape of a U or the like, the stack is formed such that it fills a round or oval cross section, wherein adjacent turns of the stack have to be electrically insulated from one another.

U.S. Pat. No. 5,322,673 discloses an electrically heatable honeycomb body in which the stacks of sheet metal layers/foils are arranged in a meandering manner. This arrangement is particularly suitable for honeycomb bodies with non-round or non-oval cross sections, that is to say, for example, with rectangular cross sections.

In this embodiment, constrictions are provided for each change in direction or folding of the stack. In the region of these constrictions, the foils rest smoothly one on the other and, respectively, do not exhibit any structuring. However, producing stacks of foils of this kind is complicated, wherein damage to the foils may nevertheless occur when folding the stacks.

SUMMARY OF THE INVENTION

Proceeding from the above, an object of the present invention is to at least partially solve the technical problems outlined in connection with the prior art. A particular aim is to specify a connection of layer packets, which connection may be established in a simple and reproducible manner, wherein flexible adaptation to different cross sections of a honeycomb body is also intended to be possible.

These objects are achieved by a connection described which includes various features, and may be further described such that the features may be combined with one another in any desired, technologically appropriate manner, and may be supplemented by explanatory facts from the description, with further design variants of the invention being indicated.

A contribution is made to this aim by an electrically conductive connection between at least two electrically conductive stacks of at least partially structured, sheet metal layers/metal foils which form a large number of channels through which a fluid may flow. This connection comprises at least one electrically conductive rod element which passes through the at least two stacks, wherein a spacer element is arranged on the at least one rod element and between the at least two stacks, the two stacks being arranged at a distance from one another by the spacer element. An arrangement which comprises the at least two stacks, the at least one rod element and the spacer element and is clamped by at least one clamping element is also provided.

This electrically conductive connection now allows, instead of an individual stack which runs in a meandering manner and has constrictions, a plurality of stacks of foils, which stacks run in a rectilinear manner and are stacked one on the other for example, to be electrically conductively connected by means of a rod element. This electrically conductive connection allows local changes in resistance, which may occur specifically at folds of a stack for example (the electric current preferably flows along the "inner foil"— that is to say along the "shortest" path or along the path with the lowest electrical resistance), and "hot spots" (local hot points) which are produced as a result to be prevented.

In particular, the rod element is a solid spacer which, in particular, passes through the ends of the stacks and electrically conductively connects the stacks.

The electrical connection ensures a permanently low value for the electrical resistance [ohm] of the connection. Furthermore, a homogeneous temperature distribution is ensured when electrically heating the honeycomb body since so-called "hot spots", for example at the otherwise existing folds of the stacks, do not occur.

In particular, the at least one rod element is arranged transverse to a profile of the channels and transverse to a surface of the respective stack.

At least one stack preferably has at least one end and the rod element passes through the stack in the region of the end. In particular, all of the stacks are connected by way of their respective ends to adjacent stacks by means of a connection.

In particular, the spacer element is formed by a flange of the rod element, wherein the two stacks are arranged at a distance from one another by the flange. In particular, the spacer element is therefore integrally formed with the rod element (for example a stepped bolt).

In particular, the foils of a stack bear against one another in the direct vicinity of the rod element substantially without gaps. In particular, the foils are of non-structured design at least in this direct vicinity of the rod element or are pressed together by the clamping of the arrangement such that they bear against one another substantially without gaps.

The at least one rod element and the spacer element together preferably have an electrical resistance (ohm) to an electric current [ampere] which flows through the arrangement, the electrical resistance being at most 20% of the electrical resistance [ohm] of any stack. It is very particularly preferred for the at least one rod element and the spacer element together to have an electrical resistance of at most 10% or even only at most 5% of the electrical resistance of any stack. By way of example, the at least one rod element and the spacer element together have an electrical resistance in the region of approximately 500 µohm (microohms). By way of example, one stack has an electrical resistance of 10 mohm (milliohms) to 1 ohm. The stack under consideration here is, in particular, the stack which has been connected or electrically contacted the longest when stacks of different lengths are used. The electrical resistance in a stack is determined along the desired current flow, that is to say in the direction of its length in particular.

In particular, the at least one clamping element is formed by a beading of the rod element (for example in the manner of a rivet).

In particular, the rod element and the at least one clamping element, or the spacer element and the at least one clamping element, form a screw/nut unit.

The rod element is preferably designed with an external thread (screw), and the clamping element is preferably designed with an internal thread (nut).

The spacer element preferably has a bore with an internal thread into which the clamping element engages in the form of a screw with an external thread. In this case, the screw-like clamping element forms the rod element which passes through a stack.

In particular, at least one clamping element is a clip which interacts with a groove in the rod element.

In particular, the rod element and the at least one clamping element, or the spacer element and the at least one clamping element, form a bore/pin unit, wherein the pin used is, in particular, a cylindrical pin, a conical pin, a notched pin or a clamping pin. The spacer element preferably has a bore into which a pin of the clamping element engages (the reverse is also possible). In this case, the pin of the clamping element forms the rod element which passes through a stack.

The technical solution further comprises a honeycomb body with a cross section through which a fluid (exhaust gas) may flow and which is formed by a plurality of stacks which are arranged next to one another, wherein stacks which are arranged respectively adjacent to one another are electrically conductively connected to one another at their ends by means of a connection according to the invention to in each case at least one rod element, so that an electrical current path which runs in a meandering manner is formed through the stacks and the at least one rod element.

In particular, stacks which are arranged adjacent to one another are electrically conductively connected to one another only by means of at least one rod element and otherwise are arranged in a manner separated from one another by an air gap in each case and therefore in an electrically insulated manner.

The stacks preferably extend in a substantially rectilinear manner.

In particular, the cross section of the honeycomb body, which cross section is formed by the stacks which are arranged next to one another, is substantially rectangular.

A further aspect also proposes a motor vehicle, at least having an internal combustion engine and an exhaust gas treatment system for treating an exhaust gas of the internal combustion engine, wherein the exhaust gas treatment system has at least one honeycomb body according to the technical solution described above.

The proposed technical solution and the technical field will be explained in greater detail below with reference to the figures. The figures show particularly preferred exemplary embodiments, but the technical solution is not limited to the exemplary embodiments. In particular, it should be noted that the figures and, in particular, the illustrated proportions are purely schematic. Identical reference symbols in the figures identify identical objects.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention will be described in more detail below with reference to an embodiment example and figures, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
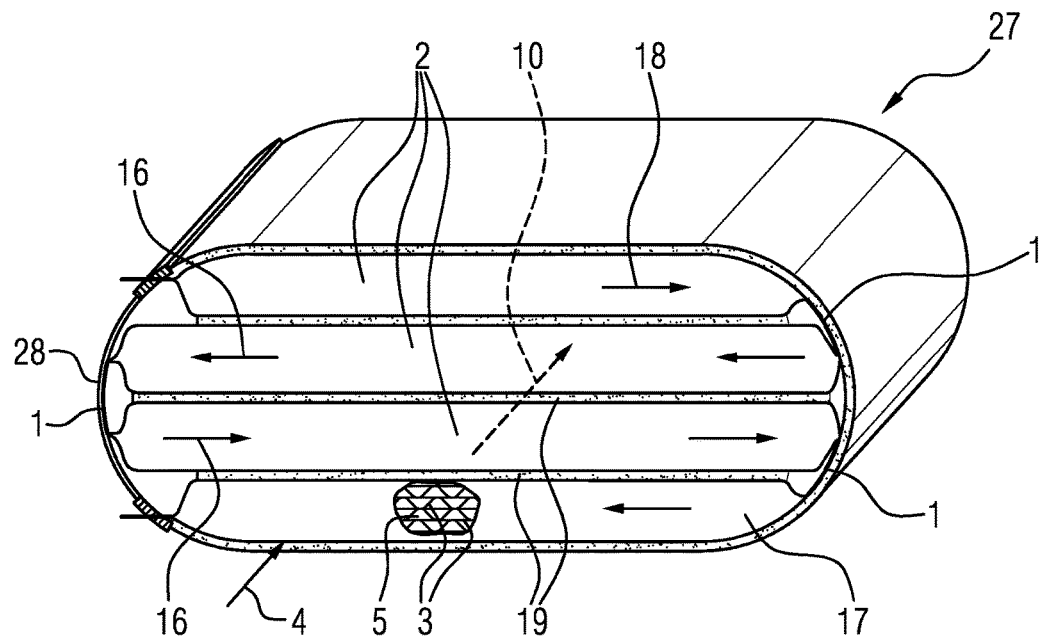
FIG. 1 schematically shows a honeycomb body according to U.S. Pat. No. 5,332,672.

FIG. 1 shows a known honeycomb body 27 according to U.S. Pat. No. 5,322,672 having a cross section 17 through which a fluid 4 (exhaust gas) may flow and which is formed by a plurality of stacks 2 of foils 3 which are arranged next to one another, wherein stacks 2 which are arranged respectively adjacent to one another are electrically conductively connected to one another by means of constrictions 28 as connections 1, so that an electric current 16 is conducted through the stacks 2 along an electrical current path 18 which runs in a meandering manner. The structured foils 3 are pressed together in the region of the constrictions 28 such that they bear flat against one another. The honeycomb body 27 is formed by a single stack 2 of foils 3, wherein the constrictions 28 have been created in order to produce the required cross section 17 of the honeycomb body 27 by folding the foils 3. The stacks 2 which now rest one on the other are in each case at a distance from each other, for example by air gaps 19 (or insulating coatings or insulating layers). The stacks 2 are formed by smooth and structured foils 3 which form a large number of channels 5 through which a fluid 4 may flow.

Instead of the constrictions 28, it is now proposed here to employ an electrically conductive connection 1 which is illustrated with the aid of the following figures.

Figure 2:
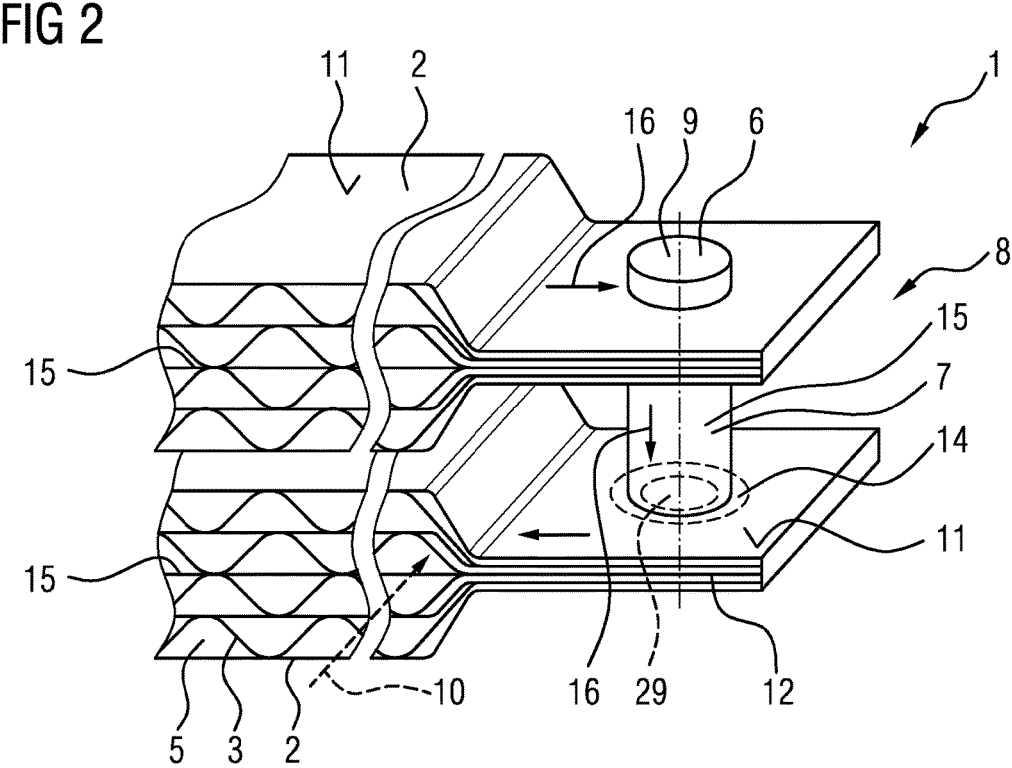
FIG. 2 schematically shows two stacks which are electrically conductively connected to one another by a connection.

FIG. 2 shows two stacks 2 which are electrically conductively connected to one another by a connection 1. The electrically conductive connection 1 connects two electrically conductive stacks 2 which have at least partially structured, metal foils 3. The foils 3 form a large number of channels 5 through which a fluid 4 may flow. The connection 1 comprises at least one electrically conductive rod element 6 which passes through the at least two stacks 2, wherein a spacer element 7 by way of which the two stacks 2 are arranged at a distance from one another is arranged on the rod element 6 and between the at least two stacks 2. An arrangement 8 comprising the at least two stacks 2, the rod element 6 and the spacer element 7 is clamped by at least one clamping element 9.

Here, the rod element 6 is arranged transverse to a profile 10 of the channels 5 and transverse to a surface 11 of the respective stack 2. The rod element 6 passes through the stack 2 in the region of the end 12. For this purpose, the end 12 of the stack 2 (that is to say the foils 3) has an opening 29 through which the rod element 6 extends.

The foils 3 of the stack 2 bear against one another in the direct vicinity 14 of the rod element 6 substantially without gaps.

The rod element 6 and the spacer element 7 together have an electrical resistance 15 to an electric current 16 which flows through the arrangement 8, the electrical resistance being at most 20% of the electrical resistance 15 of any stack 2.

Figure 3:
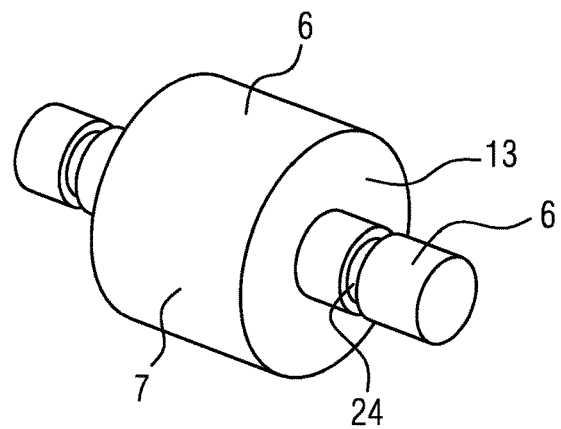
FIG. 3 schematically shows a rod element with a groove.

FIG. 3 shows a rod element 6 with a groove 24. The rod element 6 forms, with a flange 13, the spacer element 7.

Figure 4:
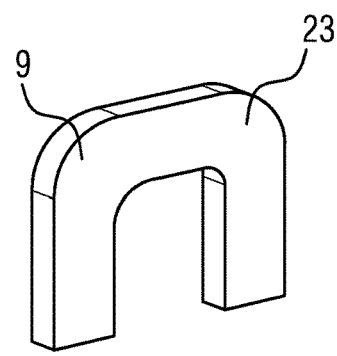
FIG. 4 schematically shows a clip as clamping element.

FIG. 4 shows a clip 23 as clamping element 9.

Figure 5:
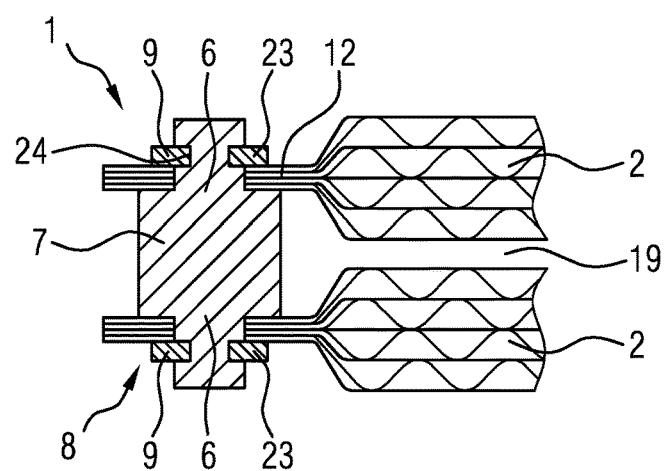
FIG. 5 schematically shows an arrangement with a connection comprising a rod element and clips as clamping elements.

FIG. 5 shows an arrangement 8 with a connection 1 comprising a rod element 6 and clips 23 as clamping elements 9 in accordance with FIGS. 3 and 4. The foils 3 in the region of the ends 12 of the stacks 2 are pressed together and the arrangement 8 is clamped by the clips 23 which are pushed into the grooves 24.

Figure 6:
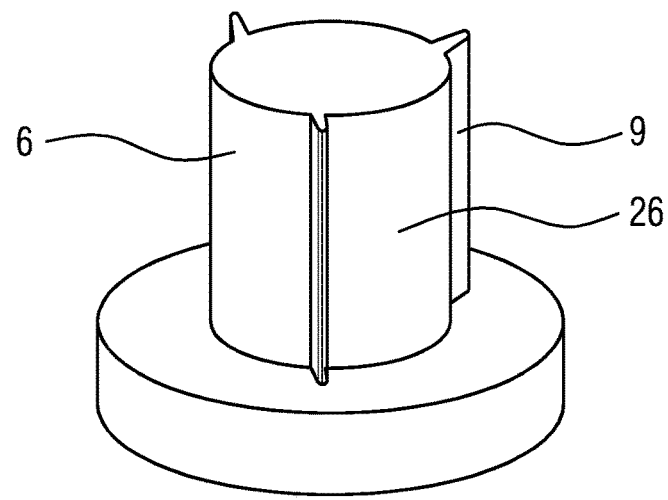
FIG. 6 schematically shows a clamping element designed as a notched pin.

FIG. 6 shows a clamping element 9 as pin 26, here designed as a notched pin.

Figure 7:
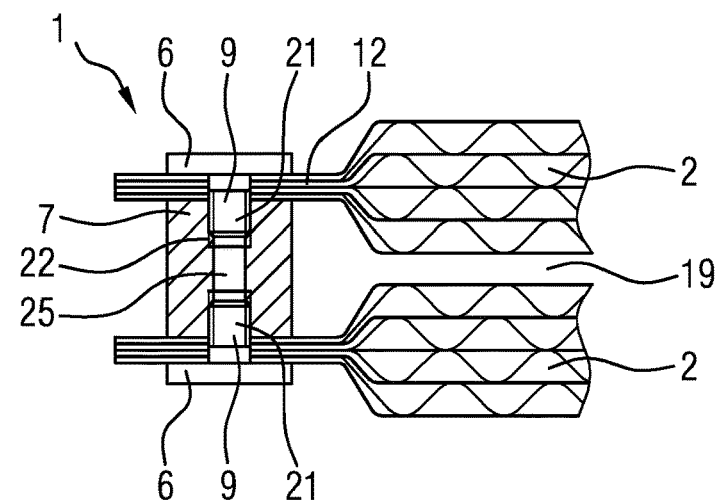
FIG. 7 schematically shows an arrangement with a connection comprising two clamping elements according to FIG. 6 as rod elements and a spacer element.

FIG. 7 shows an arrangement 8 with a connection 1 comprising two clamping elements 9 according to FIG. 6 as rod elements 6 and a spacer element 7. The foils 3 in the region of the ends 12 of the stacks 2 are pressed together and the arrangement 8 is clamped by the pins 26 of the clamping elements 9, which pins are pushed into the bore 25. Here, the pins 26 form the rod elements 6.

FIG. 7 may likewise be used to describe an arrangement 8 with a connection 1, in which arrangement the spacer element 7 and the at least one clamping element 9 form a screw 21/nut 22 unit. Here, the spacer element 7 has a bore 25 in each case with an internal thread (nut 22) for the clamping element 9 which is designed as screw 21. The clamping elements 9 form the rod elements 6 here too.

Figure 8:
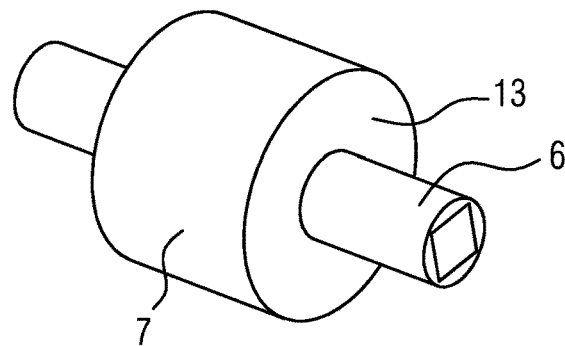
FIG. 8 schematically shows a rod element designed as a rivet.

FIG. 8 shows a rod element 6 designed as a rivet. The rod element 6 forms, with a flange 13, the spacer element 7.

Figure 9:
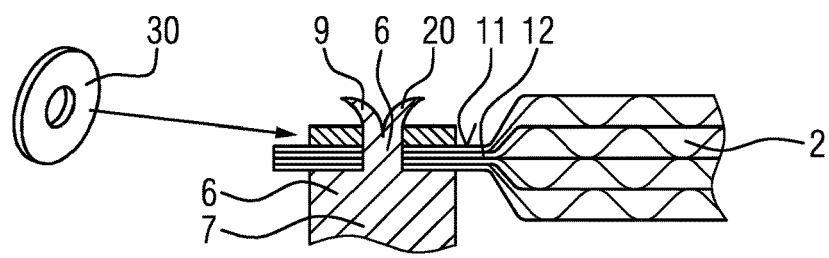
FIG. 9 schematically shows a connection with a rod element according to FIG. 8 and a disk.

FIG. 9 shows a connection 1 with a rod element 6 according to FIG. 8 and a disk 30. The clamping element 9 is formed by a beading 20 of the rod element 6. The beading 20 presses the disks 30 against the surface 11 of the stack 2 in the region of the end 12. The foils 3 in the region of the ends 12 of the stack 2 are pressed together in this way and the arrangement 8 is clamped in this way.

Figure 10:
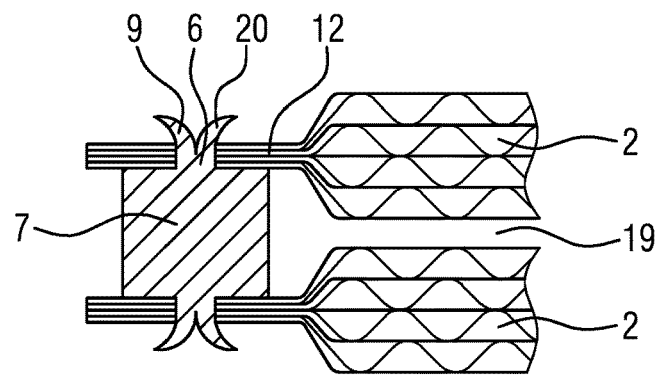
FIG. 10 schematically shows an arrangement with a rod element according to FIG. 8.

FIG. 10 shows the arrangement 8 according to FIGS. 8 and 9, only without using a disk 30. The foils 3 in the region of the ends 12 of the stacks 2 are pressed together by the beading 20 and the arrangement 8 is clamped in this way.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electrically conductive connection between at least two electrically conductive stacks of at least partially structured, metal foils which form a plurality of channels through which a fluid may flow, the electrically conductive connection comprising:
    at least one electrically conductive rod element which passes through the at least two stacks;
    a spacer element arranged on the at least one electrically conductive rod element and between the at least two stacks, such that the at least two stacks are arranged at a distance from one another by the spacer element; and
    at least one clamping element;
    wherein the at least two stacks, the rod element and the spacer element are clamped by at least one clamping element.

2. The electrically conductive connection of claim 1, further comprising:
    a profile, the plurality of channels having the profile; and
    a surface being part of at least one of the at least two electrically conductive stacks;
    wherein the at least one rod element is arranged transverse to the profile of the plurality of channels and transverse to the surface of the at least one of the at least two electrically conductive stacks.

3. The electrically conductive connection of claim 1, further comprising:
    at least one end being part of each of the at least two electrically conductive stacks;
    wherein the at least one electrically conductive rod element passes through the stack in the region of the at least one end of each of the at least two electrically conductive stacks.

4. The electrically conductive connection of claim 1, further comprising:
    a flange being part of the at least one electrically conductive rod element, such that the spacer element is at least partially formed by the flange of the at least one electrically conductive rod element;
    wherein the at least two electrically conductive stacks are arranged at a distance from one another by the flange.

5. The electrically conductive connection of claim 1, wherein the at least one electrically conductive rod element and the spacer element have an electrical resistance to an electric current which flows through the arrangement.

6. The electrically conductive connection of claim 5, wherein the electrical resistance is at most 20% of the electrical resistance of one of the at least two electrically conductive stacks.

7. The electrically conductive connection of claim 1, the at least one electrically conductive rod element further comprising:
    a beading;

wherein the at least one clamping element is formed by the beading of the at least one electrically conductive rod element.

8. The electrically conductive connection of claim 1, further comprising a screw/nut unit, wherein the at least one electrically conductive rod element and the at least one clamping element form the screw/nut unit.

9. The electrically conductive connection of claim 1, further comprising a screw/nut unit, wherein the spacer element and the at least one clamping element form the screw/nut unit.

10. The electrically conductive connection of claim 1, the at least one clamping element further comprising:
a clip;
wherein the clip interacts with a groove formed as part of the at least one electrically conductive rod element.

11. The electrically conductive connection of claim 1, further comprising a bore/pin unit, wherein the at least one electrically conductive rod element and the at least one clamping element form the bore/pin unit.

12. The electrically conductive connection of claim 1, further comprising a bore/pin unit, wherein the spacer element and the at least one clamping element, form the bore/pin unit.

13. A honeycomb body with a cross section through which a fluid may flow, comprising:
a plurality of stacks which are arranged next to one another, each of the plurality of stacks having at least one end; and
a plurality of connections, the at least one end of at least two of the plurality of stacks is electrically conductively connected together by one of the plurality of connections;
each of the plurality of connections further comprising:
at least one electrically conductive rod element which passes through the plurality of stacks;
a spacer element arranged on the at least one electrically conductive rod element and between two of the plurality of stacks, such that the two of the plurality of stacks are arranged at a distance from one another by the spacer element; and
at least one clamping element, and the plurality of stacks, the rod element and the spacer element are clamped by at least one clamping element;
wherein an electrical current path is formed through the plurality of stacks and the at least one electrically conductive rod element.

\* \* \* \* \*